United States Patent
Gentner

(10) Patent No.: US 9,981,512 B2
(45) Date of Patent: May 29, 2018

(54) COUPLING UNIT

(71) Applicant: Scambia Holdings Cyprus Limited, Limassol (CY)

(72) Inventor: Wolfgang Gentner, Steinheim (DE)

(73) Assignee: Scambia Holdings Cyprus Limited, Limassol (CY)

( * ) Notice: Subject to any disclaimer, the term of this patent is extended or adjusted under 35 U.S.C. 154(b) by 25 days.

(21) Appl. No.: 14/620,857

(22) Filed: Feb. 12, 2015

(65) Prior Publication Data

US 2015/0231938 A1 Aug. 20, 2015

(30) Foreign Application Priority Data

Feb. 14, 2014 (DE) .......................... 10 2014 101 869

(51) Int. Cl.
*B60D 1/06* (2006.01)

(52) U.S. Cl.
CPC ...................................... *B60D 1/06* (2013.01)

(58) Field of Classification Search
CPC .................................... B60D 1/40; B60D 1/06
USPC .......................... 280/491.1, 491.3, 478.1, 511
See application file for complete search history.

(56) References Cited

U.S. PATENT DOCUMENTS

| | | | | |
|---|---|---|---|---|
| 4,082,311 A * | 4/1978 | Hamman | ................ | B60D 1/065 280/507 |
| 6,053,521 A | 4/2000 | Schertler | | |
| 6,722,684 B1 * | 4/2004 | McAllister | ............... | B60D 1/06 177/146 |
| 8,966,998 B2 | 3/2015 | Gentner et al. | | |
| 2006/0290102 A1 * | 12/2006 | VanBuskirk, Jr. | ........ | B60D 1/58 280/511 |
| 2013/0001924 A1 * | 1/2013 | Adamczyk | ............. | B60D 1/065 280/511 |
| 2013/0341888 A1 * | 12/2013 | Kadnikov | ................ | B60D 1/06 280/511 |
| 2014/0103619 A1 * | 4/2014 | Motts | ....................... | B60D 1/06 280/511 |

FOREIGN PATENT DOCUMENTS

| | | |
|---|---|---|
| DE | 102010029414 A1 | 12/2011 |
| DE | 102012105316 A1 | 12/2013 |

(Continued)

*Primary Examiner* — Jacob D Knutson
(74) *Attorney, Agent, or Firm* — Reinhart Boerner Van Deuren P.C.

(57) ABSTRACT

In order to provide a coupling unit for a trailer coupling of a motor vehicle comprising a coupling ball and a coupling ball carrier carrying the coupling ball with the aid of which the loads effective thereon when in use can be detected in a reliable and simple manner, it is proposed that the coupling unit comprise a load-bearing structure which engages around a channel extending parallel to an axis, and that a reference finger extending from a first end to a second end in a longitudinal direction approximately parallel to the axis be arranged in the channel, wherein said finger is fixed at the first end such as to be static relative to the load-bearing structure and extends such as to be free from deformations of the load-bearing structure up to the second end, and wherein the second end cooperates with a sensor unit which detects a relative position of the second end relative to a region of the load-bearing structure engaging around it.

25 Claims, 12 Drawing Sheets

(56) References Cited

FOREIGN PATENT DOCUMENTS

| EP | 2567837 | A1 | * | 3/2013 | ............. | B60D 1/248 |
| EP | 2332750 | B1 | * | 9/2014 | ............... | B60D 1/06 |
| GB | 2348508 | A | | 10/2000 | | |

* cited by examiner

COUPLING UNIT

CROSS REFERENCE TO RELATED PATENT APPLICATION

This patent application claims the benefit of German application number 10 2014 101 869.9 of Feb. 14, 2014, the teachings and disclosure of which are hereby incorporated in their entirety by reference thereto.

BACKGROUND OF THE INVENTION

The invention relates to a coupling unit for a trailer coupling of a motor vehicle comprising a coupling ball and a coupling ball carrier carrying the coupling ball.

Coupling units of this type are known from the state of the art.

In the case of these coupling units, the need exists for the forces effective upon the coupling ball when in use to be detected in a suitable manner since these forces have an effect upon the handling of the motor vehicle on the one hand and represent a measure for the loading of the coupling unit and thus for the loading on the trailer coupling on the other.

Consequently, the object of the invention is to provide a coupling unit for a trailer coupling of a motor vehicle wherein the forces effective thereon when in use can be reliably detected in a simple manner.

SUMMARY OF THE INVENTION

In accordance with the invention, this object is achieved by a coupling unit of the type described hereinabove in that the coupling unit comprises a load-bearing structure which engages around a channel extending parallel to an axis, and in that a reference finger extending from a first end to a second end in a longitudinal direction approximately parallel to the axis is arranged in the channel, wherein said finger is fixed at the first end such as to be static relative to the load-bearing structure and extends such as to be free from deformations of the load-bearing structure up to the second end, and in that the second end cooperates with a sensor unit which detects a relative position of the second end relative to a region of the load-bearing structure engaging around it.

The advantage of the solution in accordance with the invention is to be seen on the one hand in that with the aid of this solution in accordance with the invention the possibility exists of detecting deformations of the load-bearing structure in a simple manner since the region of the load-bearing structure engaging around the second end moves relative to the region of the reference finger fixing the first end when there is a deformation of the load-bearing structure.

These movements are effected however over small distances which can nevertheless be reliably detected by an appropriately constructed sensor unit.

Up to now, no details in regard to the construction of the load-bearing structure have been given.

Thus, one advantageous exemplary embodiment envisages that the load-bearing structure engages around the channel in U-shaped manner.

Another advantageous solution envisages that the load-bearing structure completely engages around the channel at least in sections.

A particularly expedient solution envisages that the load-bearing structure be a structure which encompasses the channel and is closed in the circumferential direction.

Likewise, no details in regard to the arrangement of the reference finger in the channel have been given in connection with the preceding explanation of the individual embodiments.

Thus, one advantageous solution envisages that the reference finger extend in the channel in non-contacting manner relative to the load-bearing structure from the first end up to the second end i.e. it is not affected in any way by the deformations of the load-bearing structure in the section where no contact is made.

The reference finger itself can be implemented as an object of complex geometry, whereby it is of advantage for the solution in accordance with the invention if the reference finger is not deformed in temperature-dependent manner.

In particular, the reference finger is implemented from a material that is invariant to the effects of temperature or as an object of invariant shape.

As an alternative thereto, it is possible for the reference finger to be constructed in such a way that it has the same expansion characteristics as the load-bearing structure.

Expediently, provision is made for the reference finger to be an inherently stiff structure which holds the second end such that it is positioned rigidly or in bending-resistant manner relative to the first end.

In particular thereby, provision is made for the reference finger to be in the form of a bar.

Up to now, no details in regard to the construction of the sensor unit have been given.

Thus, one advantageous solution envisages that the sensor unit comprise at least one spacing sensor.

A spacing sensor of this type is preferably a magnetic sensor which works, in particular, with a magnetic field of a permanent magnet.

Expediently, the spacing sensor is fixed to the load-bearing structure.

A particularly space-saving and compactly constructed solution envisages that the spacing sensor be fixed to a region of the load-bearing structure engaging around the second end.

A further advantageous solution envisages that the sensor unit comprise at least two spacing sensors which detect the spacing of the second end from the load-bearing structure engaging around it in different spatial directions.

A further advantageous solution envisages that the sensor unit comprise at least two mutually opposite sensors for detecting a relative movement of the second end relative to the load-bearing structure in one spatial direction.

A further advantageous solution envisages that the sensor unit comprise at least two sensors for detecting the relative movement between the second end and the load-bearing structure in each spatial direction.

No details in regard to the construction of the channel have been given in connection with the preceding explanation of the individual exemplary embodiments.

Thus, one advantageous solution envisages that the channel be arranged exclusively in the coupling ball carrier and that the load-bearing structure be formed by a section of the coupling ball carrier engaging around the channel.

Another advantageous solution envisages that the channel pass through the coupling ball and a region thereof adjoining the first end of the coupling ball carrier.

As an alternative or in addition to the solutions described so far, a further advantageous solution envisages that the channel pass through a ball-base extension of the coupling ball carrier which carries the coupling ball.

A particularly expedient solution envisages that the channel pass through the coupling ball, the ball-base extension and a region of the coupling ball carrier which is located on a side of the ball-base extension opposite the coupling ball and adjoined thereto.

In this case, all these elements of the coupling unit form the load-bearing structure.

A particularly expedient solution envisages that at least the ball-base extension form the load-bearing structure that is deformable by the load on the coupling ball since the ball-base extension is usually the section of the coupling ball carrier which is subject to the largest amount of deformation.

In this solution however, it is likewise expedient for the load-bearing deformable structure to also comprise at least a part of the coupling ball.

Furthermore, it is expedient, if the load-bearing deformable structure comprises at least one region of the coupling ball carrier that is of widened cross-section, whereby this region of widened cross-section is preferably the region which carries the ball-base extension.

In regard to the arrangement of the reference finger, especially in the case where the ball-base extension forms the load-bearing deformable structure, one expedient solution envisages that the first end of the reference finger be arranged such that it is fixed relative to the coupling ball.

Another advantageous solution envisages that the reference finger be arranged such that the first end thereof is fixed relative to the region of widened cross-section of the coupling ball carrier.

Up to now, no details in regard to the evaluation of the signals of the sensor unit have been given.

Thus, one advantageous solution envisages that the sensor unit be coupled to an evaluating unit which recognizes a load-free state of the coupling unit and detects the spacings from the second end of the reference finger in said load-free state and, based upon that load-free state, determines the load on the coupling ball from the relative change in spacing between the second end and the load-bearing structure taken with reference to the load-free state.

In particular thereby, provision is made for a calibration curve specific to the coupling unit to be stored in the evaluating unit, and by means thereof, the determination of the load effective upon the coupling ball is effected from the changes in the spacing.

Furthermore, provision is advantageously made for the evaluating unit to recognize the load-free state from additional information.

One possibility is for the evaluating unit to recognize the load-free state by virtue of a trailer coupling power socket not being active, i.e. there is no power supply connection to an object that is to be attached to the trailer coupling.

Another possibility is for the evaluating unit to determine whether or not a coupling ball seating is engaging the coupling ball with the aid of an angle of rotation sensor that is likewise provided in the coupling ball.

Further features and advantages of the invention form the subject matter of the following description taken in conjunction with the graphical illustration of some exemplary embodiments.

DETAILED DESCRIPTION OF THE INVENTION

Figure 1:
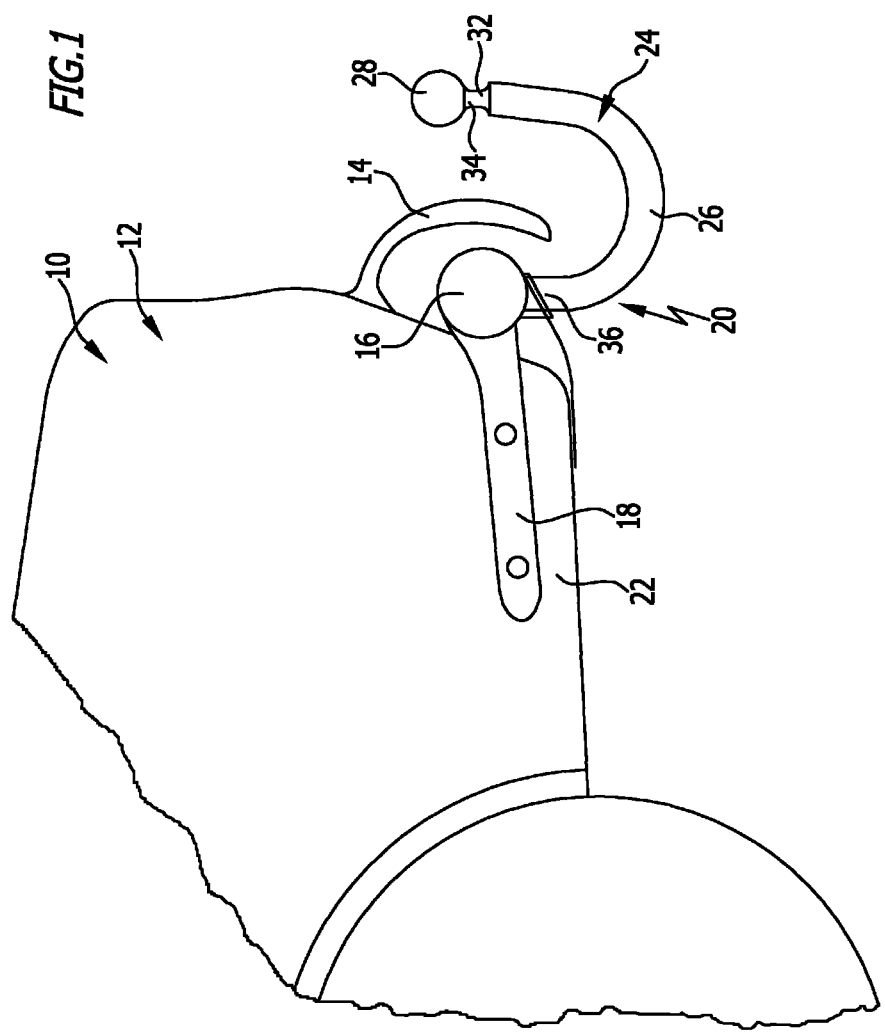
FIG. 1 shows a partially sectional side view of a rear region of a motor vehicle with a trailer coupling.

The rear of the bodywork of a motor vehicle denoted by 10 that is illustrated in FIG. 1 and bears the general reference 12 carries a rear-end bumper unit 14 which extends over a cross-beam of a trailer coupling 20 bearing the general reference 16, wherein the cross-beam 16 is usually fixed to mounting regions 22 at the rear 12 of the vehicle body 10 which are provided for this purpose by means of side members 18 that are connected thereto at both sides thereof.

A coupling unit of the trailer coupling 20 which bears the general reference 24 is arranged on the cross-beam 16 and comprises a coupling ball carrier 26 which is held on the cross-beam 16 as well as a coupling ball 28 which is held on an end region 32 of the coupling ball carrier 26.

Preferably, the end 32 of the coupling ball carrier 26 forms a ball-base extension 34 which has a cylinder-like outer contour and, in particular, is of reduced cross-section compared with the remaining cross-section of the coupling ball carrier 26.

Another end 36 of the coupling ball carrier 26 opposite the end 32 is connected either rigidly or releasably or in pivotal manner to the cross-beam 16.

Figure 2:
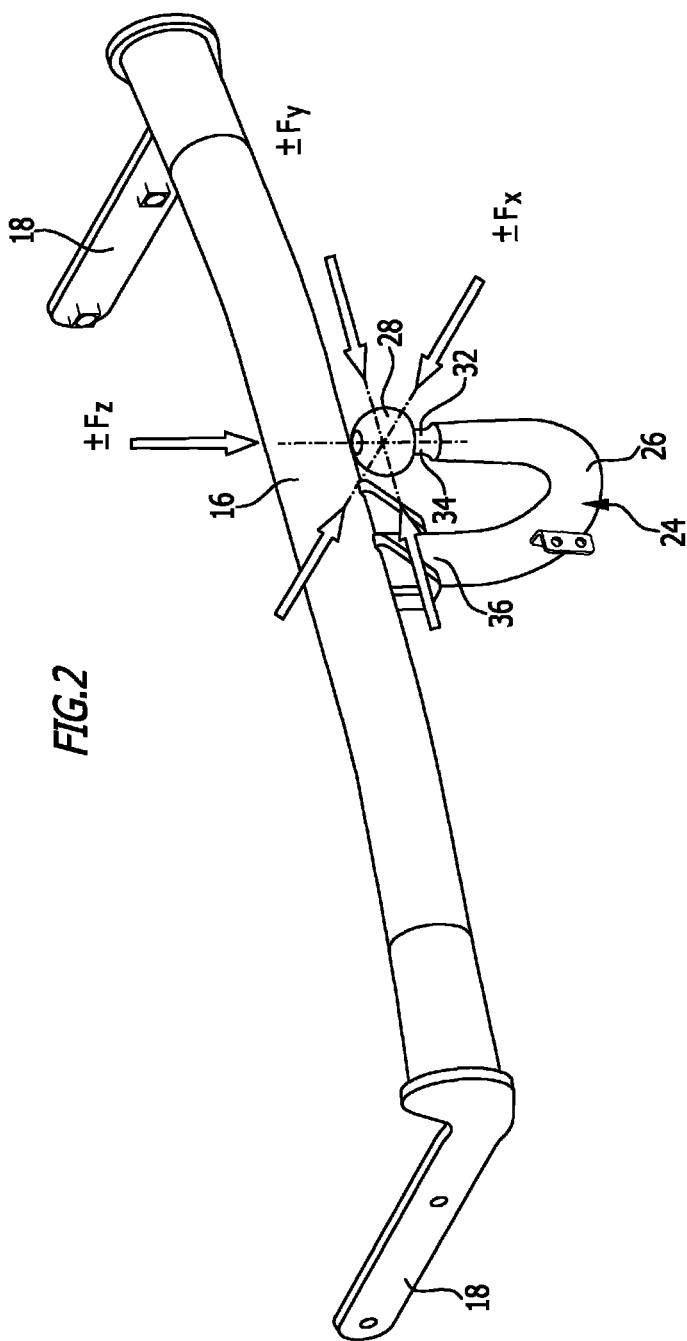
FIG. 2 a perspective illustration of a trailer coupling comprising a cross-beam and a coupling unit.

As is illustrated in FIG. 2, forces FX in the X-direction i.e. in the horizontal longitudinal direction of the vehicle body 10, forces FY in the Y-direction i.e. likewise acting horizontally but perpendicularly to the horizontal longitudinal direction of the vehicle body 10 and forces FZ in the Z-direction i.e. in the vertical direction perpendicular to the X-direction and to the Y-direction are effective on the coupling ball 28 when the trailer coupling is in use wherein a trailer loading is imposed on the coupling ball 28 by means of a seating for the coupling ball 28 for example.

Ultimately, all these forces FX, FY and FZ also have an effect upon the handling of a motor vehicle provided with a trailer coupling of this type.

The detection of one or more of the forces or loads effective on the coupling unit 24 can take place in the most varied of manners.

Figure 3:
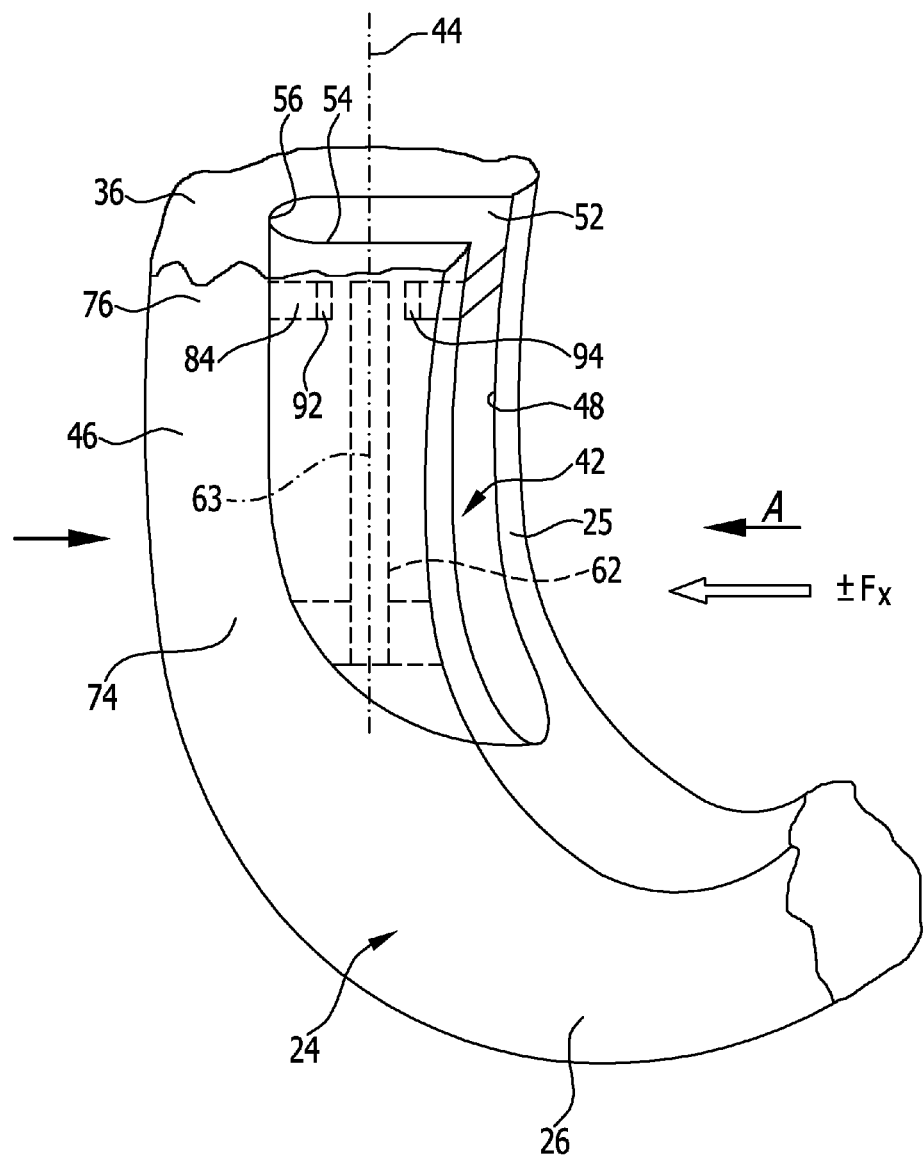
FIG. 3 a sectional illustration of a region of a coupling ball carrier in accordance with a first exemplary embodiment of a coupling unit in accordance with the invention.
Figure 4:
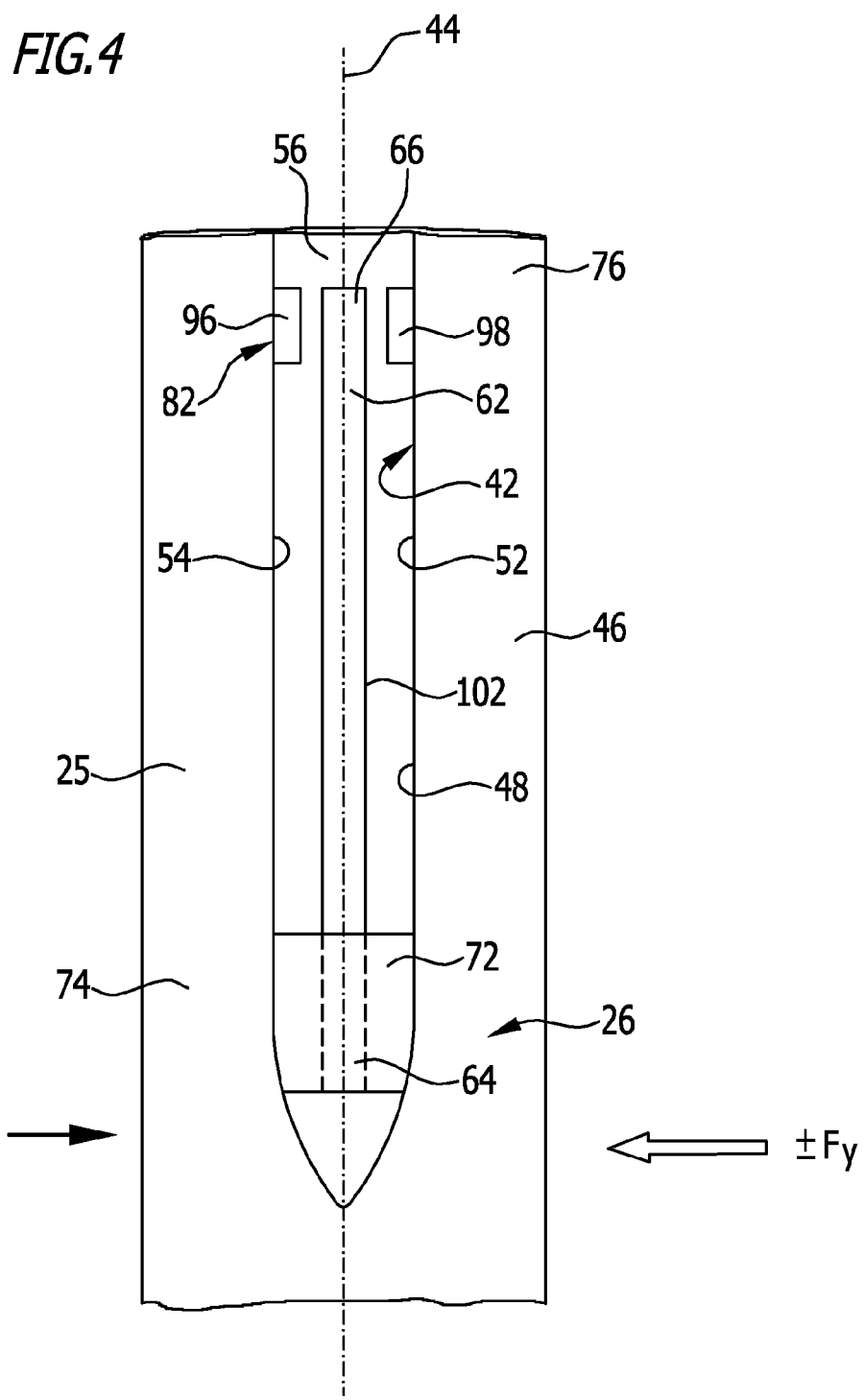
FIG. 4 a view of the region illustrated in FIG. 3 in the direction of the arrow A in FIG. 3.

In a first exemplary embodiment of the coupling unit 24 in accordance with the invention which is illustrated in FIGS. 3 and 4, the coupling ball carrier 26 comprises a U-shaped channel 42 which is located within the region close to the second end 36 and extends into the coupling ball carrier 26 from a rear side 25 of the coupling ball carrier 26 remote from the vehicle body 10 whilst extending in the direction of an axis 44 in the coupling ball carrier 26, whereby a load-bearing structure 46 of the coupling ball carrier 26 engages around the channel 42 although not completely for example, but rather engages around it in such a way that the channel 42 has an opening 48 having at least one component extending in the direction of the axis 44, whereby in this case for example, the opening 48 is provided in the coupling ball carrier 26 remote from the coupling ball 28.

Thus, commencing from the opening 48, the channel 42 has two mutually spaced side walls 52 and 54 which merge into a rear wall 56 opposite the opening 48.

In connection therewith, the channel 42 does not necessarily extend through the entire coupling ball carrier 26, but merely runs in a section thereof so that the load-bearing structure 46 forms a partial section of the coupling ball carrier 26 engaging around the channel 42, although not engaging around it entirely.

A reference finger bearing the general reference 62 is arranged in the channel 42 and preferably extends in the longitudinal direction 63 thereof parallel to the central axis 44 from a first end 64 up to a second end 66.

In the region of the first end 64 thereof for example, the reference finger 62 is held relative to the load-bearing structure 46 and is held immovably relative thereto by means of a retaining body 72 so that the first end 64 of the reference finger 62 follows the movements of a section 74 of the load-bearing structure 46 fixing the retaining body 72.

As an alternative thereto, it is also conceivable for the reference finger 62 to be fixed directly in the load-bearing structure 46.

The second end 66 of the reference finger 62 cooperates with a sensor unit 82 which, for example, comprises sensors 92, 94, 96 and 98 which are arranged in a direction transverse to the central axis 44 or transverse to the longitudinal direction 63 at a distance from the second end 66 of the reference finger 62, whereby the sensors 92 and 94 are arranged in a first direction on both sides of the second end 66 at a spacing therefrom and the sensors 96 and 98 are arranged in a second direction running transverse to the first direction on both sides of the second end 66 at a spacing therefrom.

A sensor base 84 of the sensor unit 82 is fixed to a section 76 of the load-bearing structure 46, whereby the section 76 has a spacing from the section 74 has a spacing corresponding approximately to the length of the reference finger 62.

In particular, commencing from the first end 64 thereof, the outer contour 102 of the reference finger 62 extends in the channel 42 in non-contact-making manner, i.e. in particular, it is spaced from the side walls 52 and 54 as well as from the rear wall 56 so that the movements of the second end 66 of the reference finger 62 are not affected by the part of the load-bearing structure 46 extending beyond the section 74.

Should a deformation of the coupling ball carrier 26 now occur, then this also leads inevitably to a deformation of the coupling ball carrier 26 in the region of its load-bearing structure 46 engaging around the channel 42 and thus to a relative movement of the section 74 of the load-bearing structure 46 relative to the section 76 of the load-bearing structure 46.

The reference finger 62 is, however, only fixed relative to the section 74 so that each movement of the section 76 of the load-bearing structure 46 relative to the section 74 leads to a change in the spacing of the second end 66 from the sensors 92, 94, 96 or 98 in dependence on the direction in which the force effective upon the coupling ball 28 is directed, and which is thus also effective upon the coupling ball carrier 26 as a whole in all the regions thereof between the first end 32 and the second end 36.

Thus for example, a force FX on the coupling ball 28 changes the spacings of the second end 66 from the sensors 92 and 94 and a force FY on the coupling ball 28 changes the spacings of the second end 66 from the sensors 96 and 98.

The sensors 92, 94, 96 and 98 are preferably spacing sensors especially magnetically operative spacing sensors, which means, in particular, spacing sensors working on the basis of a change in a magnetic field which are able to detect the spacing between the respective sensor 92, 94, 96 and 98 and the second end 66 with a high resolution in the order of less than 1 μm, insofar as the second end 66 of the reference finger 62 is made of a material having an effect upon a magnetic field.

For example, each of the sensors 92, 94, 96, 98 comprises a permanent magnet and a magnetic field sensor of which the latter experiences, and can thus measure, a change in the magnetic flux therethrough when the spacing from the second end alters.

Figure 5:
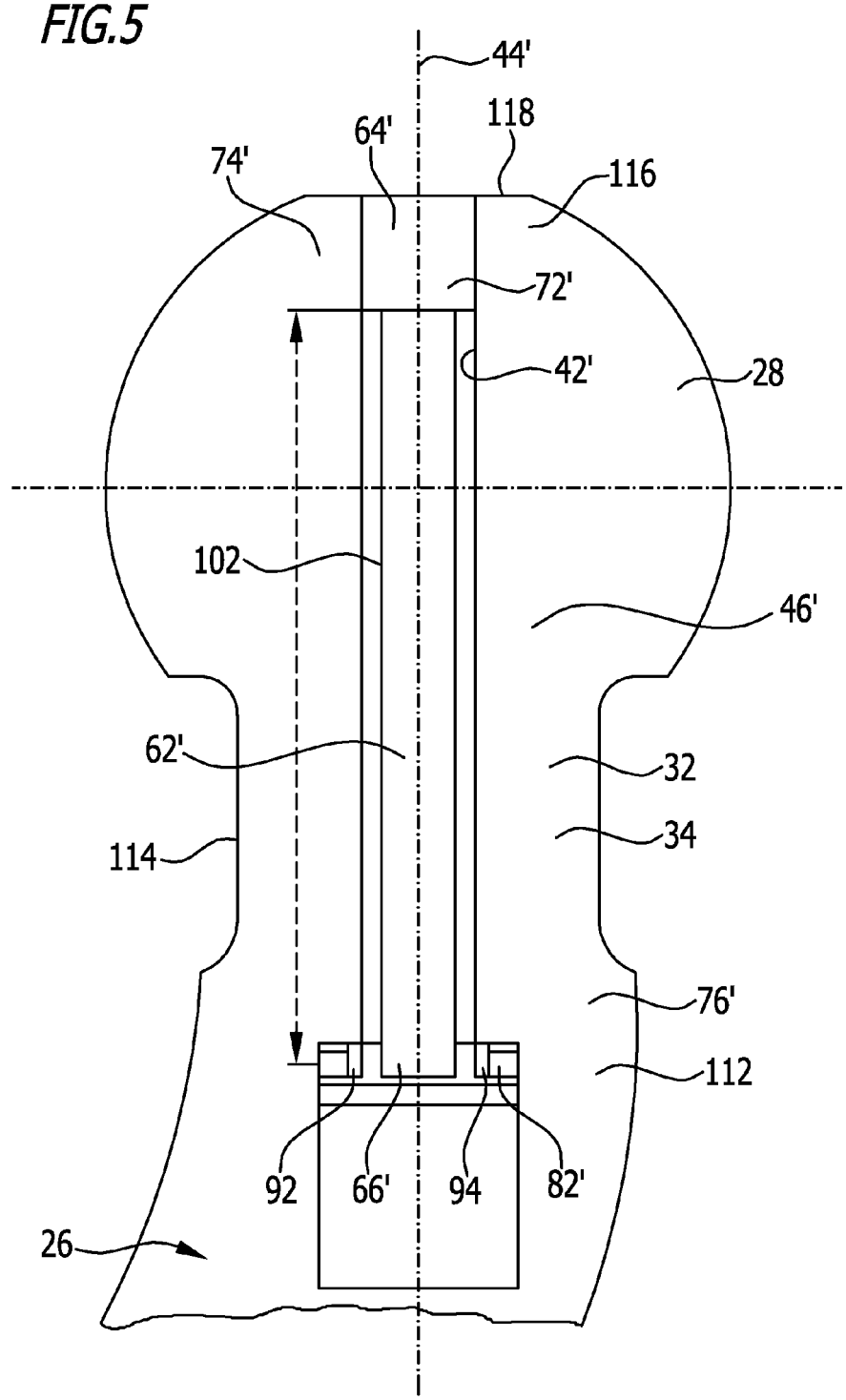
FIG. 5 a sectional illustration of a second exemplary embodiment of a coupling unit in accordance with the invention in the region of a coupling ball of a ball-base extension and in a region of a coupling ball carrier of widened cross-section.

In a second exemplary embodiment that is illustrated in FIG. 5, the channel is not arranged in the region close to the second end 36, but rather, the channel 42' extends through the entire coupling ball 28 and, commencing therefrom, into the second end 32 of the coupling ball carrier 26, namely, through the ball-base extension 34 up to a region of widened cross-section 112 adjoining the ball-base extension 34. The axis 44' along which the channel 42' runs is a central axis of the ball-base extension 34 which preferably has an outer contour that extends cylindrically relative to the axis 44'.

The load-bearing structure 46' in this second exemplary embodiment is formed on the one hand by the coupling ball 28 itself as well as by the ball-base extension 34 and the region of widened cross-section 112 of the coupling ball carrier 26 and it completely encloses the channel 42' which is preferably in the form of a cylindrical boring relative to the axis 44' through the coupling ball 28, the ball-base extension 34 and the region of widened cross-section 112 of the coupling unit 24.

In the second exemplary embodiment, the reference finger 62 is held at the first end 64 by the retaining body 72' in a section 74' of the load-bearing structure 46' which, for example, is an upper ball cap region 116 of the coupling ball 28 that is located opposite the ball-base extension 34 and directly adjoins a flat face 118 of the coupling ball 28 remote from the ball-base extension 34.

The reference finger 62' in this exemplary embodiment extends through the coupling ball 28 and the ball-base extension 34 into the region of widened cross-section 112 of the coupling ball carrier 26 so that the second end 66' lies in the region of widened cross-section 112 and the region of widened cross-section 112 of the coupling ball carrier 26 forms the section 76' to which the sensor unit 82' is fixed.

In the case of this exemplary embodiment too, the reference finger 62' extends from the first end 64' thereof up to the second end 66' in non-contact making manner relative to the channel 42' so that a movement of the section 76' of the load-bearing structure 46' relative to the section 74' thereof likewise leads to a change in the spacing between the sensors 92, 94, 96 and 98 of the sensor unit 82' and the second end 66'.

In this case, the load-bearing structure 46' which extends from the region 74' up to the region 76' is deformable especially in the region of the ball-base extension 34 so that the movements of the region 76' relative to the region 74' are due primarily to deformations in the region of the ball-base extension 34.

Figure 6:
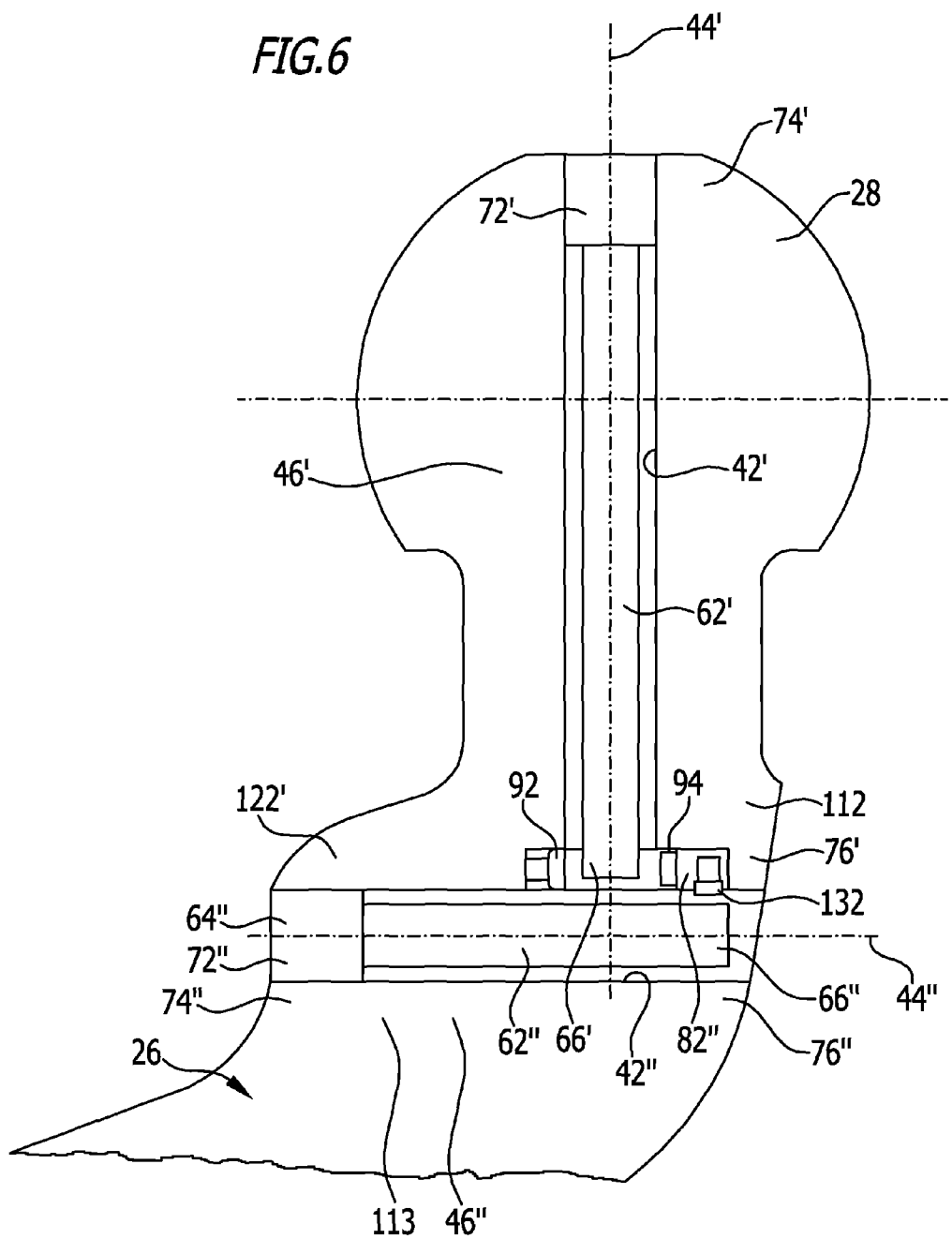
FIG. 6 an illustration similar to FIG. 5 of a third exemplary embodiment of a coupling unit in accordance with the invention.

In a third exemplary embodiment of a coupling unit in accordance with the invention which is illustrated in FIG. 6, those parts that are identical to those of the second exemplary embodiment are provided with the same reference symbols so that reference can be made in regard to the description thereof to the full content of the description of the second exemplary embodiment.

In contrast to the second exemplary embodiment illustrated in FIG. 5, the third exemplary embodiment which is illustrated in FIG. 6 is provided with a channel 42" which is additional to the channel 42' and extends along an axis 44" that runs transverse to the axis 44' through the coupling ball carrier 26 within a region of widened cross-section 122', whereby a reference finger 62", which extends from a first end 64" to a second end 66" and is fixed by a retaining body 72" in the region of the first end 64", is likewise provided in the channel 42".

In this case, the load-bearing structure 46" is the region 112 of the coupling ball carrier 26 of thickened cross-section which engages around the channel 42", whereby a movement of the section 76" relative to the section 74" to which the first end 64" is fixed by the retaining body 72", likewise leads to a change in the spacing between a sensor 132 and the second end 66" of the reference finger 62".

Preferably thereby, the channel 42" runs in such a way that the sensor 132 is arranged on a sensor unit 82" which also simultaneously carries the sensors 92 and 94 for detecting the second end 66' of the reference finger 62'.

Since the axis 44" and thus too the channel 42" run transverse to the axis 44', it is also possible to detect deformations of the coupling ball carrier 26 which result from a force FZ on the coupling ball 28 in the Z-direction.

Figure 7:
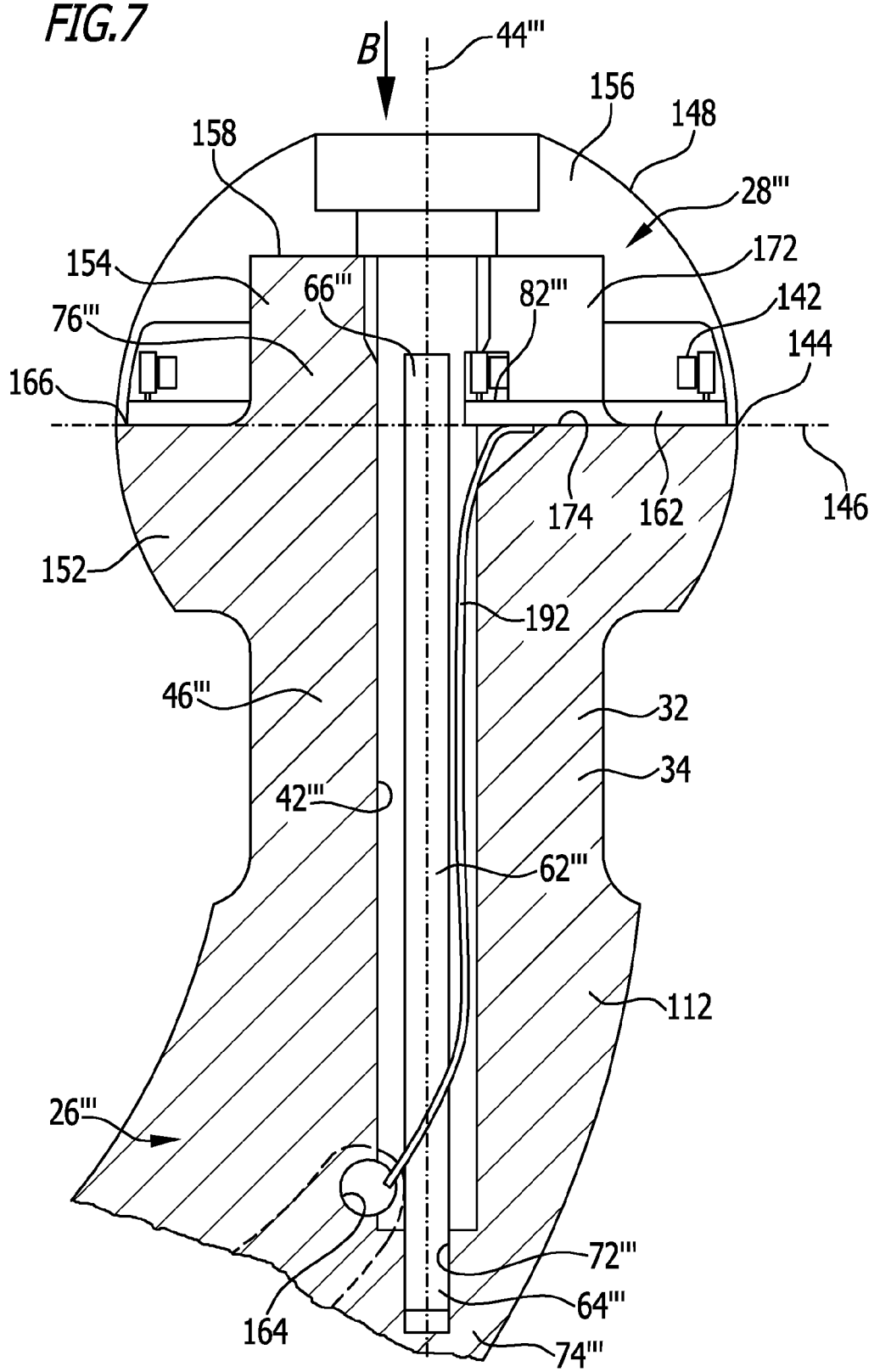
FIG. 7 an illustration similar to FIG. 5 of a fourth exemplary embodiment of a coupling unit in accordance with the invention.

In a fourth exemplary embodiment of a coupling unit in accordance with the invention that is illustrated in FIG. 7, the channel 42''' extends, in similar manner to the second exemplary embodiment, through both the coupling ball 28 and the ball-base extension 34 and into the region of widened cross-section 112.

In this case however, the fixing of the reference finger 62''' is effected in the region of its first end 64''' in a retaining body 72''' formed by the coupling ball carrier 26 itself which represents a one-piece region of the coupling ball carrier 26'''.

Consequently, the reference finger 62''' is fixed relative to the region of widened cross-section 112 of the coupling ball carrier 26 and the second end 66''' of the reference finger 62''' thus lies within the coupling ball 28'''.

In the exemplary embodiment described here, the coupling ball 28''' is implemented in such a way that it comprises an angle of rotation sensor 142 which is arranged close to an equatorial line 144, preferably on a side of a separating plane 146 intersecting the equatorial line 144 which is remote from the ball-base extension 34.

Furthermore, the coupling ball 28 in this exemplary embodiment is divided into two and comprises a base region 152 extending from the ball-base extension 34 up to the dividing plane 146, a carrying region 154 which extends from the base region 152 and is connected thereto especially in one piece manner although it does not extend up to the surface of the ball 148, but rather, comprises a supporting surface 158 which is set back relative thereto and runs parallel to the interface 146 for example. Another ball cap element 156 is seated on the carrying region 154 and, for its part, this element is supported on the carrying region 154 on the supporting surface 158 and is fixed to the carrying region 154 in interlocking and mutually non-rotational manner with respect to rotation about the axis 44''' and it forms that part of the surface of the ball which is located on the side of the dividing plane 146 and the angle of rotation sensor 142 that is remote from the ball-base extension 34.

An angle of rotation sensor 142 of this type is described in the German patent application DE 10 2012 105 316.2 for example, to the full contents of which reference is made in this connection.

Figure 8:
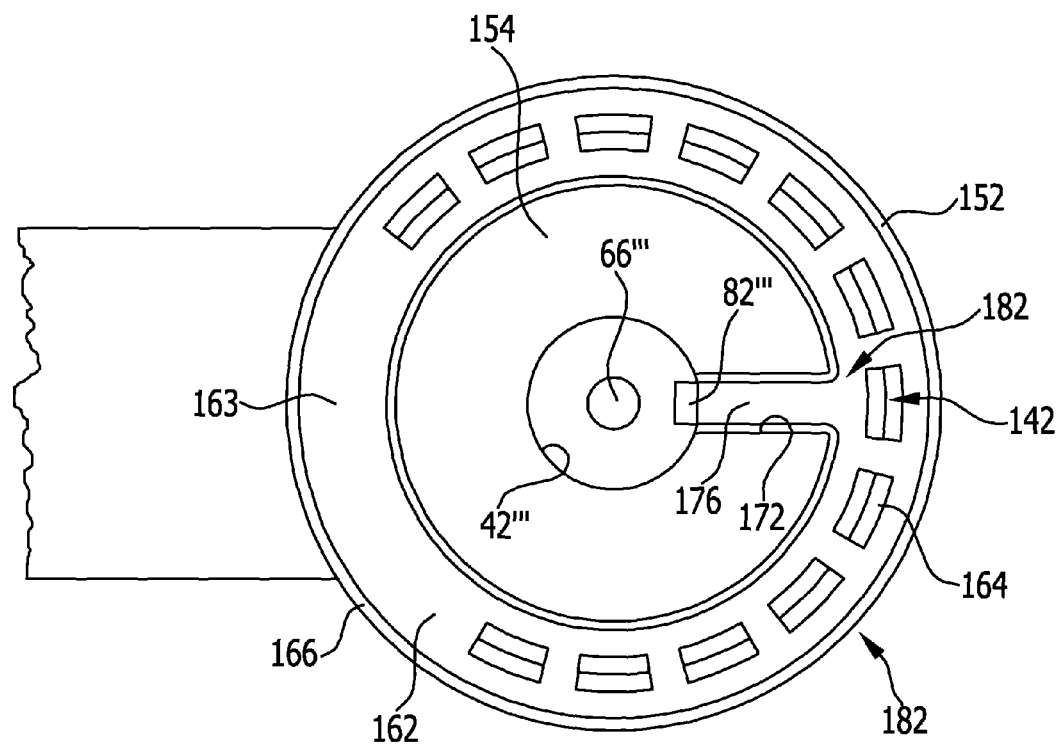
FIG. 8 an illustration of the fourth exemplary embodiment in accordance with FIG. 7 in the form of a plan view in the direction of the arrow B in FIG. 7 wherein the ball cap element is removed.

In this exemplary embodiment, the angle of rotation sensor 142 comprises a platen 162 comprising an annular body 163, upon which, as illustrated in FIG. 8, are arranged around the carrying region 154 a succession of sensor elements 164 which likewise operate in particular as magnetic spacing sensors having a permanent magnet and a magnetic field sensor and which serve for detecting the position of a ball coupling seating that is arranged outside the coupling ball 28''' and is resting thereon.

In connection therewith, the platen 216 rests upon an annular surface 166 extending around the carrying region 154 at approximately the level of the dividing plane 146, and it is itself annular as illustrated in FIG. 8.

Furthermore, the carrying region 154 is provided with a slot 172 which passes radially therethrough relative to the central axis 44''' and extends radially outwardly from the channel 42''', said slot 172 being formed in such a manner that the base of the slot 174 runs at the level of the annular surface 166 and extends up to the supporting surface 158 of the carrying region 154 from the base of the slot 174.

A tongue 176 which is formed on the annular body 163 of the platen 162 of the angle of rotation sensor 142 extends into this slot 172 and runs on into the channel 42''' and it also carries the sensor unit 82''' adjacent to the channel 42''' or projecting into it so that the sensor unit 82''' and the angle of rotation sensor 142, which are located on the platen 162, together form a sensor system 182 which can be mounted snugly and interconnected on the base region 152 and the carrying region 154.

Figure 9:
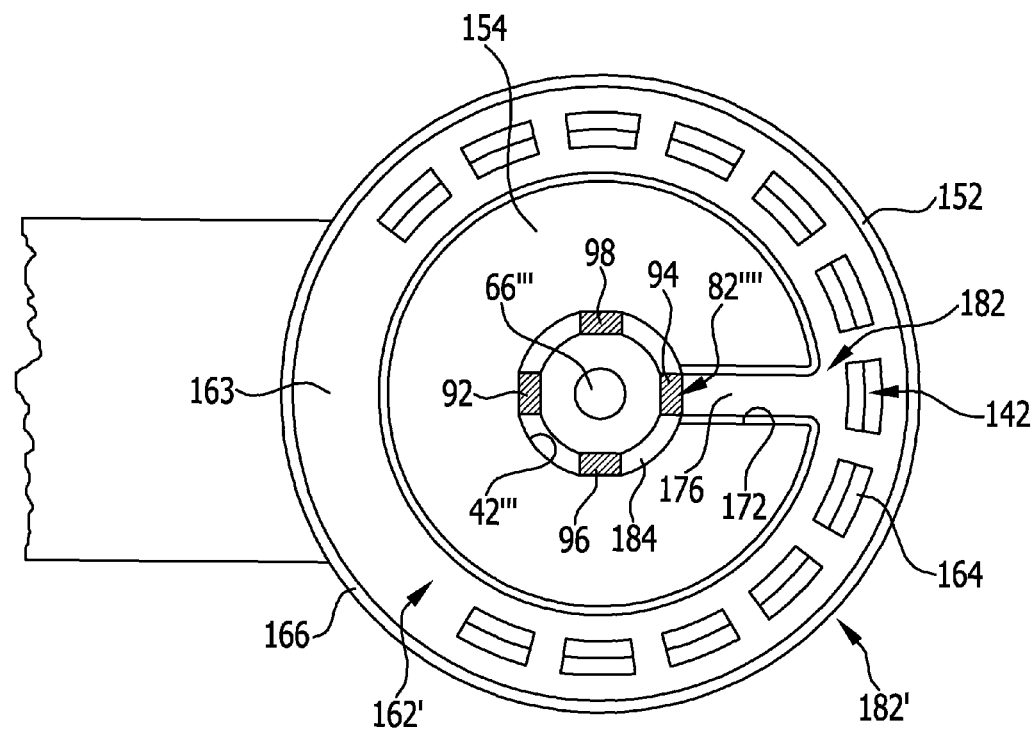
FIG. 9 an illustration similar to FIG. 8 of a variant of the fourth exemplary embodiment.

In a variant of the fourth exemplary embodiment that is illustrated in FIG. 9, a holding ring 184 which is formed on the tongue 176 of the platen 162' in one piece manner is positionable within the channel 42''' during the process of assembling the platen 162' so that, in this case, the sensor unit 82'''' can accommodate not just one sensor, but altogether, the four sensors 92, 94, 96, 98 which make it possible as a result of detecting the respective spacings from the second end 66''' of the reference finger 62''' to determine the forces FX in the X-direction and also the forces FY in the Y-direction for example insofar as they lead to a deformation of the load-bearing structure 46" as was explained in connection with the first exemplary embodiment of the sensor unit 82 in accordance with the invention for example.

In the case of this variant, the sensor unit 82''' seated on the platen 162 and the angle of rotation sensor 142 likewise form a sensor system 182' which is mountable as a unit and fixable to the base region 152 and the carrying region 154.

Expediently in this exemplary embodiment, the channel 42''' is used not only to accommodate the reference finger 62''' but in addition thereto, to accommodate electrical lines 192 to both the angle of rotation sensor 142 and to the sensor unit 82''' which, commencing from a side opening 194 that opens out into the channel 42''' in the region of widened cross-section 112, enter the channel 42''' and run along the channel 42''' up into the coupling ball 28 to the angle of rotation sensor 142 and to the sensor unit 82'''.

In all other respects, those parts of the fourth exemplary embodiment which are identical with those of the preceding exemplary embodiments are provided with the same reference symbols so that reference can be made to the explanations given in regard to these exemplary embodiments.

Figure 10:
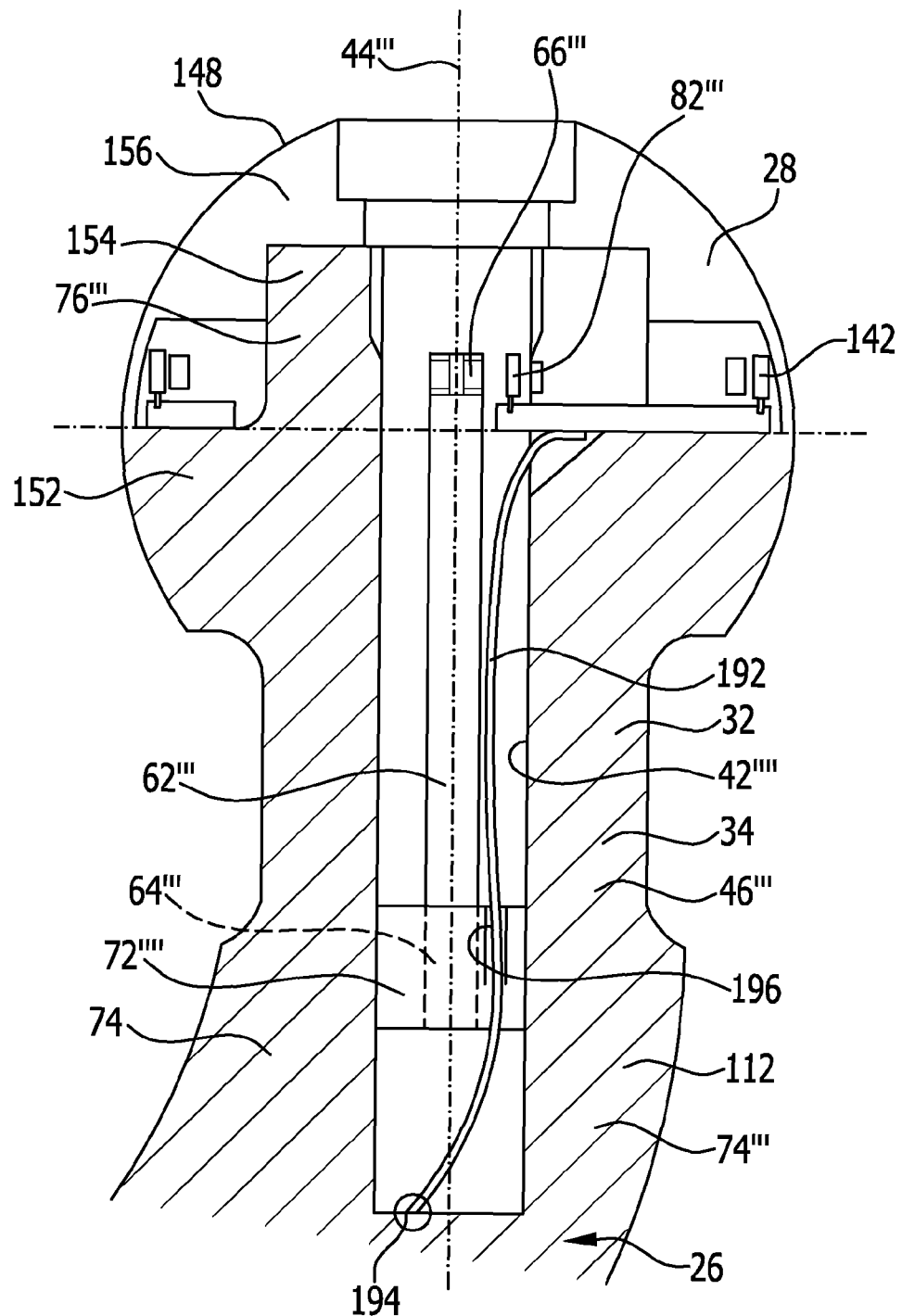
FIG. 10 an illustration similar to FIG. 5 of a fifth exemplary embodiment of a coupling unit in accordance with the invention.

In a fifth exemplary embodiment that is illustrated in FIG. 10, the conditions substantially correspond to those of the fourth exemplary embodiment but with the difference that the reference finger 62''' is fixed in the channel 42'''' by a retaining body 72'''' in the region of widened cross-section 112 which thus represents the section 74 of the load-bearing structure 46'''.

In this case, the electrical lines 192 are likewise led through the channel 42'''', but they are also fed through the retaining body 72'''', through a through opening 196 in the retaining body 72'''' for example, and they run in the channel 42'''' up to the angle of rotation sensor 142 and the sensor unit 82'''.

In all other respects, the fifth exemplary embodiment is constructed in like manner to those of the fourth exemplary embodiment so that those elements which are identical to the fourth and the preceding exemplary embodiments are provided with the same reference symbols and consequently reference can be made to the full explanatory contents of the fourth exemplary embodiment in regard to the detailed description of these elements.

Figure 11:
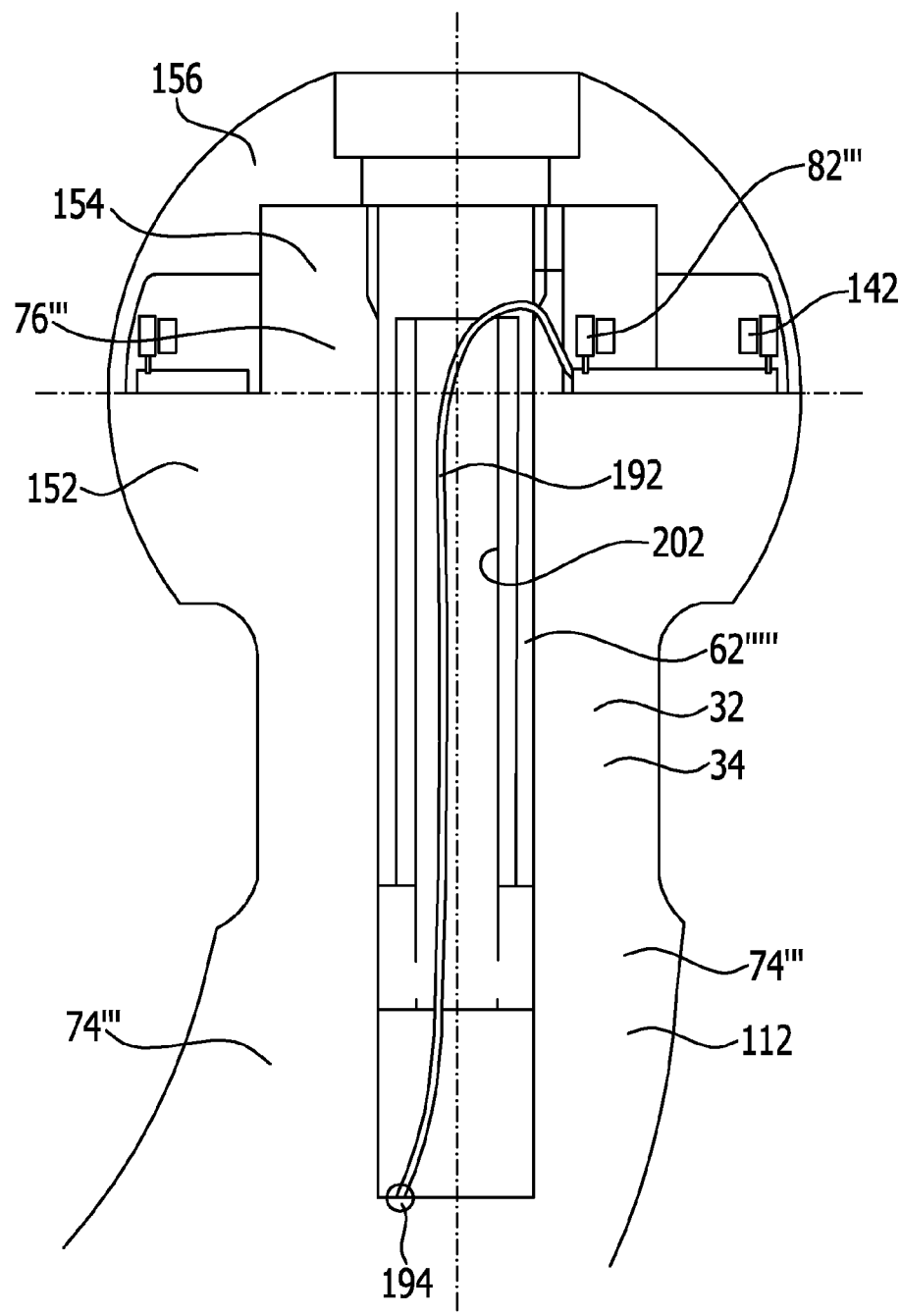
FIG. 11 an illustration similar to FIG. 5 of a sixth exemplary embodiment of a coupling unit in accordance with the invention and FIG. 12 a schematic illustration of an evaluating unit in connection with a sensor unit in accordance with the invention.

In a sixth exemplary embodiment that is illustrated in FIG. 11 but deviates from the fifth exemplary embodiment, the reference finger 62" is in the form of a tubular body which encloses a central channel 202 through which the electrical lead 192 running to the angle of rotation sensor 142 and the sensor unit 82''' is fed.

In all other respects, all the other elements which are identical to those of the fifth exemplary embodiment and the other preceding exemplary embodiments are provided with the same reference symbols so that reference can be made to the full explanatory contents of the first exemplary embodiment in regard to the description thereof.

Figure 12:
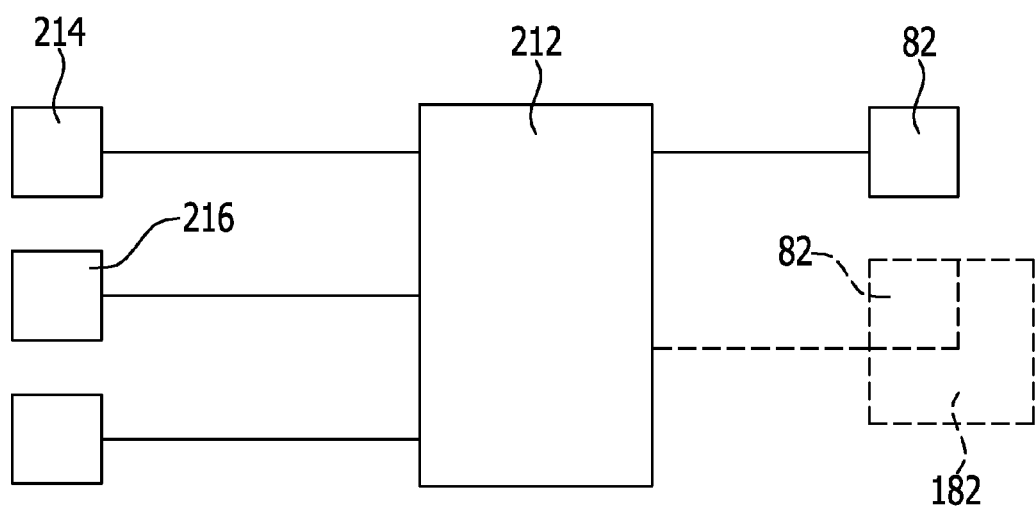

As is illustrated in FIG. 12 and is the case for all the exemplary embodiments, there is provided an evaluating unit 212 which is connected to the sensor unit 82 or to the sensor system 182 if such is provided and which captures the changes in the spacings between the one sensor 92 or the sensors 92, 94, 96, 98 relative to the second end 66 of the reference finger 62 that are detected by the sensor unit and evaluates these changes in spacing.

However, these changes in spacing are significant only if the evaluating unit 212 is able to capture a load-free starting state of the coupling unit 24.

For this reason, the evaluating unit 212 is, for example, connected to an electrical system of a vehicle 214 which detects whether there is an electrical supply connection to a trailer or to a system mountable on the trailer coupling 20 for example, and in particular, via a power plug inserted into a coupling plug socket, and, after activation of the electrical system of the vehicle by the ignition key for example, continuously checks as to whether there is a connection via the coupling plug socket to a system engaging the trailer coupling 20.

If this connection does not exist and if the electrical system of the vehicle is activated, then the evaluating unit 212 adopts the spacing values detected by the sensor unit 82 as load-free reference values and stores them.

In the case of a trailer coupling 20 in which the coupling unit 24 is held in the cross-beam 16 so as to be pivotal between a working position and an inoperative position, there is a connection between the evaluating unit 212 and a control system 216 for the pivoting of the coupling unit 24 so that the evaluating unit 212 can query whether a pivotal movement of the coupling unit 24 from the working position into the inoperative position has been effected or vice versa.

After each pivotal movement from the inoperative position into the working position, the evaluating unit 212 assumes there is a load-free state of the coupling unit and captures the values of the spacing from the second end 66 of the reference finger 62 that were measured by the sensor unit 82 in this state so that these spacing values can be stored as a load-free reference state.

In contrast thereto, if a sensor system 182 is provided then it is possible for the evaluating unit 212 to detect whether or not a coupling ball seating is engaging the coupling ball 28 by means of the angle of rotation sensor 142.

As long as there is no coupling ball seating engaging the coupling ball 28, then the values of the spacing from the second end 66 of the reference finger 62 detected by the sensor unit 84 can be stored as load-free reference values by the evaluating unit 212.

The invention claimed is:

1. Coupling unit for a trailer coupling of a motor vehicle comprising a coupling ball and a coupling ball carrier carrying the coupling ball, the coupling unit comprises a load-bearing structure, a portion of the load bearing structure engages around a channel extending parallel to an axis, a reference finger extending from a first end to a second end in a longitudinal direction approximately parallel to the axis is arranged in the channel, wherein said finger is fixed at the first end such as to be static relative to the portion of the load-bearing structure forming the channel, and extends such as to be free from deformations of the load-bearing structure up to the second end, and in that the second end cooperates with a sensor unit which detects a relative position of the second end relative to a region of the load-bearing structure engaging around said second end and in a direction transverse to the extension in the longitudinal direction of the reference finger.

2. A coupling unit in accordance with claim 1, wherein the load-bearing structure engages around the channel in U-shaped manner.

3. A coupling unit in accordance with claim 1, wherein the load-bearing structure completely engages around the channel at least in sections.

4. A coupling unit in accordance with claim 3, wherein the load-bearing structure is a structure which encompasses the channel and is closed in a circumferential direction.

5. A coupling unit in accordance with claim 1, wherein the reference finger extends in the channel in non-contacting manner relative to the load-bearing structure from the first end up to the second end.

6. A coupling unit in accordance with claim 1, wherein the reference finger is an inherently stiff structure which keeps the second end positioned rigidly or in bending-resistant manner relative to the first end.

7. A coupling unit in accordance with claim 1, wherein the reference finger is in the form of a bar.

8. A coupling unit in accordance with claim 1, wherein the sensor unit comprises at least one spacing sensor.

9. A coupling unit in accordance with claim 8, wherein the spacing sensor is fixed to the load-bearing structure.

10. A coupling unit in accordance with claim 8, wherein the sensor unit comprises the at least one spacing sensor and a second spacing sensor which detect a spacing of the second end from the load-bearing structure in different spatial directions.

11. A coupling unit in accordance with claim 8, wherein the sensor unit comprises the at least one spacing sensor and a second spacing sensor, the first and second spacing sensors in opposed space relation for detecting a relative movement of the second end relative to the load-bearing structure in one spatial direction.

12. A coupling unit in accordance with claim 8, wherein the sensor unit comprises the at least one spacing sensor and a second spacing sensor s for detecting a relative movement between the second end and the load-bearing structure in each spatial direction.

13. A coupling unit in accordance with claim 1, wherein the channel is arranged exclusively in the coupling ball carrier and in that the load-bearing structure is formed by a section of the coupling ball carrier engaging around the channel.

14. A coupling unit in accordance with claim 1, wherein the channel passes through the coupling ball and a region thereof adjoining the first end of the coupling ball carrier.

15. A coupling unit in accordance with claim 1, wherein the channel passes through a ball-base extension of the coupling ball carrier which carries the coupling ball.

16. A coupling unit in accordance with claim 1, wherein the channel passes through the coupling ball, a ball-base extension and a region of the coupling ball carrier which is located on a side of the ball-base extension opposite the coupling ball and adjoined thereto.

17. A coupling unit in accordance with claim 16, wherein the load-bearing structure also comprises at least a part of the coupling ball.

18. A coupling unit in accordance with claim 16, wherein the load-bearing structure comprises at least one region of the coupling ball carrier that is of widened cross-section.

19. A coupling unit in accordance with claim 1, wherein at least a ball-base extension forms the load-bearing structure that is deformable by the load on the coupling ball.

20. A coupling unit in accordance with claim 1, wherein the reference finger is arranged such that the first end thereof is fixed relative to the coupling ball.

21. A coupling unit in accordance with claim 20, wherein the reference finger is arranged such that the first end thereof is fixed relative to the region of widened cross-section of the coupling ball carrier.

22. A coupling unit in accordance with claim 1, wherein the sensor unit is coupled to an evaluating unit which recognizes a load-free state of the coupling unit and detects a spacing from the second end of the reference finger in the load-free state and, based upon said load-free state, determines a force on the coupling ball from a relative change in spacing between the second end and the load-bearing structure taken with reference to the load-free state.

23. A coupling unit in accordance with claim 22, wherein a calibration curve specific to the coupling unit is stored in the evaluating unit and by means thereof, the determined force effective upon the coupling ball is effected from the changes in the spacing.

24. The coupling unit of claim 1, wherein the load bearing structure is a coherent load bearing structure such that no part of the load bearing structure is rotatable relative to another part of the load-bearing structure.

25. Coupling unit for a trailer coupling of a motor vehicle comprising a coupling ball and a coupling ball carrier carrying the coupling ball, the coupling ball fixed relative to the coupling ball carrier, the coupling unit comprises a load bearing structure which engages around a channel extending parallel to an axis, a reference finger extending from a first end to a second end in a longitudinal direction approximately parallel to the axis is arranged in the channel, wherein said finger is fixed at the first end such as to be static relative to load-bearing structure, and extends such as to be free from deformations of the load-bearing structure up to the second end, and in that the second end cooperates with a sensor unit which detects a relative position of the second end relative to a region of the load-bearing structure engaging around said second end.

* * * * *

UNITED STATES PATENT AND TRADEMARK OFFICE
CERTIFICATE OF CORRECTION

PATENT NO. : 9,981,512 B2
APPLICATION NO. : 14/620857
DATED : May 29, 2018
INVENTOR(S) : Wolfgang Gentner Page 1 of 1

It is certified that error appears in the above-identified patent and that said Letters Patent is hereby corrected as shown below:

In the Claims

At Column 11, Line 19, Claim 12, the letter "s" should be deleted between the words "sensor" and "for."

Signed and Sealed this
Twenty-first Day of August, 2018

Andrei Iancu
*Director of the United States Patent and Trademark Office*